(12) United States Patent
Yu et al.

(10) Patent No.: US 12,553,866 B2
(45) Date of Patent: Feb. 17, 2026

(54) SYSTEMS FOR PREFORMING ACOUSTIC MEASUREMENT OF BATTERIES

(71) Applicant: Liminal Insights, Inc., Emeryville, CA (US)

(72) Inventors: Jason Yue Yu, Castro Valley, CA (US); Shaurjo Biswas, El Cerrito, CA (US); Yu Shi Fong, Emeryville, CA (US); Dennis Yu, Alameda, CA (US); Andrew Hsieh, Berkeley, CA (US); Ashlyn Leona D'Orazio, Berkeley, CA (US); Austin Ryan Dulaney, Emeryville, CA (US)

(73) Assignee: LIMINAL INSIGHTS, INC., Emeryville, CA (US)

( * ) Notice: Subject to any disclaimer, the term of this patent is extended or adjusted under 35 U.S.C. 154(b) by 270 days.

(21) Appl. No.: 18/109,482

(22) Filed: Feb. 14, 2023

(65) Prior Publication Data
US 2023/0258608 A1 Aug. 17, 2023

Related U.S. Application Data

(60) Provisional application No. 63/309,978, filed on Feb. 14, 2022.

(51) Int. Cl.
*G01N 29/26* (2006.01)
*G01N 29/04* (2006.01)
(Continued)

(52) U.S. Cl.
CPC ........... *G01N 29/265* (2013.01); *G01N 29/04* (2013.01); *G01N 29/44* (2013.01);
(Continued)

(58) Field of Classification Search
None
See application file for complete search history.

(56) References Cited

U.S. PATENT DOCUMENTS

| | | | |
|---|---|---|---|
| 6,871,560 B2 | 3/2005 | Shives et al. | |
| 10,629,966 B2 | 4/2020 | Biswas et al. | |

(Continued)

FOREIGN PATENT DOCUMENTS

| | | |
|---|---|---|
| CN | 110031548 A | 7/2019 |
| JP | 2004526146 A | 8/2004 |

(Continued)

OTHER PUBLICATIONS

International search report; dated Jul. 5, 2023; Application # PCT/US23/62562.

(Continued)

*Primary Examiner* — Alexander A Mercado
(74) *Attorney, Agent, or Firm* — Polsinelli PC

(57) ABSTRACT

Aspects of the present disclosure are directed to a suite of testing apparatuses and non-destructive, acoustic inspection methods for scanning and inspecting batteries to determine and characterize various physical phenomena in these batteries. In one aspect, a rastering system for non-invasive and acoustic inspection of battery cells includes a holder for placing a battery cell inside the system for the acoustic inspection, at least one transducer configured to perform acoustic measurements on the battery cell, and a controller configured with inspection parameters for performing the acoustic measurements, the inspection parameters being dynamic and interchangeable depending on at least one or more of a shape, a size, and a form factor of the battery cell.

17 Claims, 10 Drawing Sheets

(51) Int. Cl.
*G01N 29/265* (2006.01)
*G01N 29/44* (2006.01)

(52) U.S. Cl.
CPC ............... *G01N 2291/023* (2013.01); *G01N 2291/0289* (2013.01); *G01N 2291/106* (2013.01)

(56) References Cited

U.S. PATENT DOCUMENTS

| | | | | |
|---|---|---|---|---|
| 11,658,354 | B2 * | 5/2023 | Murphy | G01N 23/04 320/132 |
| 11,764,413 | B2 * | 9/2023 | Murphy | G01N 29/0654 324/426 |
| 2008/0028860 | A1 * | 2/2008 | Refko | G01H 1/16 73/597 |
| 2013/0335094 | A1 * | 12/2013 | Adams | G01R 31/387 324/426 |
| 2014/0255738 | A1 * | 9/2014 | Adams | H01M 10/4285 429/90 |
| 2016/0223498 | A1 * | 8/2016 | Steingart | G01N 29/46 |
| 2018/0120168 | A1 * | 5/2018 | Hsieh | G01K 11/24 |
| 2018/0120261 | A1 * | 5/2018 | Hsieh | G01N 29/4418 |
| 2018/0123189 | A1 * | 5/2018 | Biswas | G01N 29/28 |
| 2018/0164383 | A1 * | 6/2018 | Hsieh | H01M 10/486 |
| 2019/0072614 | A1 * | 3/2019 | Steingart | G01N 29/4481 |
| 2019/0094189 | A1 * | 3/2019 | Hsieh | G01N 29/12 |
| 2020/0284766 | A1 * | 9/2020 | Shen | G01N 29/225 |
| 2020/0358147 | A1 * | 11/2020 | Dou | H01M 10/446 |
| 2021/0096104 | A1 * | 4/2021 | Hsieh | G01N 29/11 |
| 2021/0175553 | A1 * | 6/2021 | Van Tassell | G01N 29/46 |
| 2021/0350818 | A1 * | 11/2021 | Biswas | G01N 29/2493 |
| 2021/0365009 | A1 * | 11/2021 | Biswas | H01M 10/42 |
| 2022/0205957 | A1 * | 6/2022 | Ryu | G01N 29/4427 |

FOREIGN PATENT DOCUMENTS

| | | |
|---|---|---|
| JP | 2012242388 A | 12/2012 |
| JP | 6050605 B2 | 12/2016 |
| JP | 2017168349 A1 | 9/2017 |
| JP | 2019537735 A | 12/2019 |
| JP | 2020524361 A | 8/2020 |

OTHER PUBLICATIONS

Japanese Notice of Reasons for Refusal issued Jun. 3, 2025 in corresponding Japanese Application No. 2024-547644.

* cited by examiner

SYSTEMS FOR PREFORMING ACOUSTIC MEASUREMENT OF BATTERIES

CROSS REFERENCE TO RELATED APPLICATIONS

This application claims the benefit of U.S. Provisional Application No. 63/309,978, filed on Feb. 14, 2022, and entitled "SYSTEMS AND METHODS FOR COLLECTING ACOUSTIC DATA ON BATTERY CELLS TO DETECT DEFECTS", the contents of which are hereby incorporated by reference in their entirety and for all purposes.

STATEMENT REGARDING FEDERALLY SPONSORED RESEARCH OR DEVELOPMENT

This invention was made with U.S. Federal government support under Grant No. SBIR 1831080 awarded by the National Science Foundation. The U.S. Federal government has certain rights in the invention.

FIELD OF DISCLOSURE

Disclosed aspects are directed to acoustic inspection of batteries, more specifically, to a complete suite of testing apparatuses and non-destructive, acoustic inspection methods for scanning and inspecting batteries to determine and characterize various physical phenomena in these batteries.

BACKGROUND

Demand for production of battery cells is on the rise owing to an increase in their use across various industries such as consumer electronics, automotive, clean energy, etc. Efficient and fast battery diagnostics methods are important for increasing quality, lifetime, and manufacturing process efficiency for batteries. In the case of manufacturing and production, reducing costs (e.g., price per kilowatt-hour (kWh)) is an important goal. Production costs and quality can be reduced by optimizing existing processes and/or introducing new technologies. For example, technological advances in the area of improved monitoring, manufacturing, and diagnostics can lead to cost efficiencies by shortening production process times (thus also reducing energy consumption during production), reducing waste due to damaged cells and cell parts, improving quality, etc.

Batteries come in different sizes and shapes and there is a large subset of variables and factors that can influence the fidelity of data obtained for inspection of batteries.

BRIEF DESCRIPTION OF THE DRAWINGS

The accompanying drawings are presented to aid in the description of various aspects of the disclosure and are provided solely for illustration and not limitation.

SUMMARY

Figure 1:
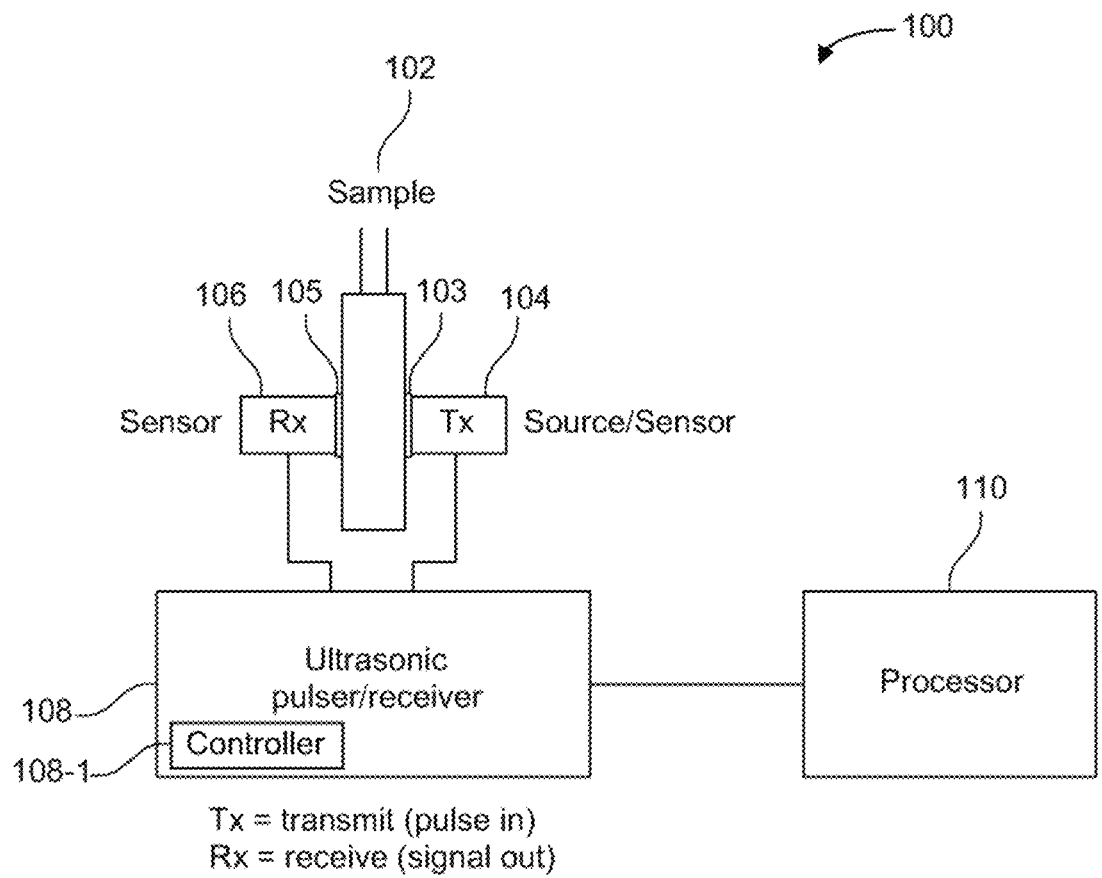
FIG. 1 illustrates an example system for analyzing a sample using acoustic signal-based analysis according to some aspects of the present disclosure.

Aspects of the present disclosure are directed to a suite of testing apparatuses and non-destructive, acoustic inspection methods for scanning and inspecting batteries to determine and characterize various physical phenomena in these batteries.

In one aspect, a rastering system for non-invasive and acoustic inspection of battery cells, the system includes a holder for placing a battery cell inside the system for the acoustic inspection, at least one transducer configured to perform acoustic measurements on the battery cell, and a controller configured with inspection parameters for performing the acoustic measurements, the inspection parameters being dynamic and interchangeable depending on at least one or more of a shape, a size, and a form factor of the battery cell.

In another aspect, the rastering system is configured for inspection of cylindrical battery cells and the battery cell is a cylindrical battery cell.

In another aspect, the at least one transducer is configured to move vertically along a curved surface of the battery cell at each angle of rotation to transmit and receive acoustic signals through the battery cell.

In another aspect, the at least one transducer is configured to obtain, based on the acoustic signals received, multiple acoustic measurements along an axial surface of the battery cell at each angle of rotation.

In another aspect, the controller is configured to analyze each of the multiple acoustic measurements to extract acoustic features indicative of physical characteristics of the battery cell at each angle of rotation, and generate an aggregated map of based on the acoustic features extracted at each angle of rotation.

In another aspect, the rastering system further includes one or more rollers configured to rotate the battery cell at a predetermined angle of rotation until an entire curved surface of the battery cell is acoustically measured.

In another aspect, the at least one transducer is an array of transducers packaged in a cylindrical unit to transmit and receive acoustic signals through an axial surface of the battery cell at each predetermined angle of rotation.

In another aspect, the at least one transducer is a roller transducer.

In another aspect, after each rotation of the battery cell by the one or more rollers, the at least one transducer is configured to obtain acoustic measurements along an axial surface of the battery cell to yield multiple acoustic measurements.

In another aspect, the controller is configured to analyze each of the multiple acoustic measurements to extract acoustic features indicative of physical characteristics of the battery cell at a corresponding angle of rotation, and generate an aggregated map of based on the acoustic features extracted at each angle of rotation.

In another aspect, the controller is configured to output at least one of a result of analyzing the multiple acoustic measurements and the aggregated map.

In another aspect, the rastering system is configured for inspection of rectangular battery cells and the battery cell is a rectangular battery cell.

In another aspect, the at least one transducer is configured to perform one or more of single-sided and a double-sided measurement of the battery cell.

In another aspect, the at least one transducer is a roller transducer.

In another aspect, the battery cell is a flat cell.

In another aspect, the controller is configured to control a movement of the at least one transducer in at least one of two directions to perform a plurality of distinct acoustic measurements across an entire surface of the battery cell.

In another aspect, the controller is configured to analyze the plurality of distinct acoustic measurements to extract meaningful acoustic features indicative of physical characteristics of the battery cell.

In another aspect, the controller is configured to generate an aggregated map of the plurality of acoustic measurements.

In another aspect, the controller is configured to output at least one of the aggregated map and a result of analyzing the plurality of acoustic measurements.

In another aspect, the inspection parameters specify a plurality of ultrasound tests from among which an ultrasound test may be applied for performing the acoustic measurements.

In another aspect, the plurality of ultrasound tests include Pulse/Echo, Pitch Catch & Through Transmission, and Beam Steering & Phase Array Applications.

In one aspect, a non-invasive method of battery inspection using acoustic measurements includes transmitting acoustic signals through a battery cell via one or more first transducers, receiving response signals in response to the acoustic signals at one or more second transducers, processing the acoustic response signals to extract acoustic features indicative of physical characteristics of the battery cell, wherein a controller is configured with inspection parameters for performing the acoustic measurements, the inspection parameters being dynamic and interchangeable depending on at least one or more of a shape, a size, and a form factor of the battery cell.

DETAILED DESCRIPTION

Certain aspects and embodiments of this disclosure are provided in the following description and related drawings. Alternate aspects may be devised without departing from the scope of the disclosure. Additionally, well-known elements of the disclosure will not be described in detail or will be omitted so as not to obscure the relevant details of the disclosure.

The word "exemplary" is used herein to mean "serving as an example, instance, or illustration." Any aspect described herein as "exemplary" is not necessarily to be construed as preferred or advantageous over other aspects. Likewise, the term "aspects of the invention" does not require that all aspects of the invention include the discussed feature, advantage or mode of operation.

The terminology used herein is for the purpose of describing particular aspects only and is not intended to be limiting of aspects of the disclosure. As used herein, the singular forms "a," "an," and "the" are intended to include the plural forms as well, unless the context clearly indicates otherwise. It will be further understood that the terms "comprises", "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequences of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Demand for production of battery cells is on the rise owing to an increase in their use across various industries such as consumer electronics, automotive, clean energy, etc. A non-limiting application of battery cells is the electrical vehicle (EV) industry. According to various market research, the industry needs massive buildouts to meeting EV demand by 2030 (around 15 times the current capacity). The cost of battery cell production should decrease by around 40% according to some estimates. Furthermore, as evidence thereof have already been seen, reliability of EV batteries is critical as human and financial remedies of EV recalls due to faulty batteries are immense (more than $3B in 2020-2021).

Battery manufacturing processes are not without challenges. For example, the cost of raw materials is on the rise and issues during manufacturing can lead to poor quality battery cells and hence unreliable battery cell being incorporated into and utilized in their respective applications such as in EVs, which can ultimately lead to the costly failures mentioned above.

For instance, battery defects that can lead to poor battery cell performance, a catastrophic battery (and/or device) failure, etc. Such defects can arise during the manufacturing process or during regular operation of a battery after the battery is placed in a device. Such defects are difficult to detect because they are generally deep within the battery cell and hidden from non-invasive imaging methods or are not substantial enough to be detected through electrical inspection methods until the defect has caused substantial damage/degradation to the battery.

In some examples, manufacturing defects can include, but are not limited to, folds, wrinkles, or holes in traditional polymer-based separator materials, cracks or fractures in solid-state ceramic based separators; dry spots within the cell due to poor electrolyte saturation; electrode holes, folds, delamination, or layer misalignment, foreign object debris, burrs, metallic particle inclusions, tab defects including tears, folds, and poor quality welds, electrode misalignment, electrode holes and folds, electrode material delamination, among others.

Operational defects can include, but are not limited to, the plating of lithium metal (e.g., dendritic growth or otherwise) on the anode material, dry spots within the cell due to electrolyte degradation, the evolution of gasses resulting from electrolyte or other chemical decomposition, among others. All of these defects can cause micro-shorts in the battery that, if allowed to propagate, can lead to early cell death, rapid loss of capacity, and/or catastrophic failure.

Currently available methods for studying defective batteries include x-ray or CT inspection of cell and tearing down a battery after it has been flagged as underperforming, a safety hazard, or a failure in the field.

Within the field of ultrasound inspection, there is a broad application space and large subset of key input variables that drive the fidelity of an ultrasonic measurement. Some of these variables include contact method, transducer frequency and bandwidth, as well as acoustic test methodology (through, pitch-catch, pulse-echo). When factoring in ultrasound with respect to inspecting batteries, there is another subset of physical phenomena which include cell geometry, form factor (pouch, prismatic, cylindrical), chemical composition, and process state that require unique optimization of acoustic test parameters to appropriately capture and quantify the phenomena.

When conducting ultrasound-based inspection tests of batteries, the wide parameter space on the test apparatus and the sample form factor can lead to challenges involving non-recurring engineering and design tasks. For example, a subset of ultrasonic test settings may be optimized to see a folded separator in a Lithium-ion battery pouch cell, but may not be able to detect electrode inclusions in the same cell. Conversely, observing a separator fold may require different ultrasonic settings in prismatic/hard can cells versus pouch cells. The wide parameter space within ultrasound as it pertains to testing batteries can require that the test system be designed so that different transducer types can be accommodated, different test methodologies can be executed electronically, and/or that the test bed can accommodate most of the common battery form factors.

Ultrasonic tests are also highly influenced by external factors. Even in the most basic tests, results can vary drastically with fluctuations in mechanical alignment, contact force, external temperature, pressure and environment, as well as within the ultrasonic coupling used to transfer the ultrasonic pulse from the transducer to the test sample. A robustly designed ultrasonic test system as described herein can factor all of these challenges in order to produce accurate and reproducible results.

The systems and techniques described herein for detecting defects in batteries can address the foregoing challenges (as well as other challenges). More specifically, the present disclosure to a suite of testing apparatuses (raster scan system(s)) and non-destructive, acoustic inspection methods for scanning and inspecting batteries to determine and characterize various physical phenomena in these batteries. The raster scan systems disclosed herein can accommodate acoustic testing of battery cells of different shapes and forms (e.g., rectangular battery cells, cylindrical battery cells) and perform one sided and/or double-sided acoustic measurement of such battery cells.

This suite of raster scan apparatuses enables a battery manufacturer to construct acoustic tests using various acoustic methods including, but not limited to, through transmission, pitch-catch, or pulse echo, swap between different ultrasonic transducer types, conduct in-situ vs in-operando measurements and adjust test settings to properly optimize for an application of interest. Once ultrasound test settings are established, the motion systems allow the discretized ultrasound test to be safely and repeatably conducted over the entire spatial area of the battery at a resolution and coupling method of the user's choice. The resulting test data is then extracted and processed with a data analysis pipeline including, but not limited to, proprietary data analytics techniques developed for processing and extracting meaningful acoustic features indicative of current and/or future physical characteristics batteries developed by Liminal Insights, Inc. of Emeryville, CA including techniques described in U.S. application Ser. No. 17/112,756 filed on Dec. 4, 2020, the entire content of which is incorporated herein by reference.

Figure 2:
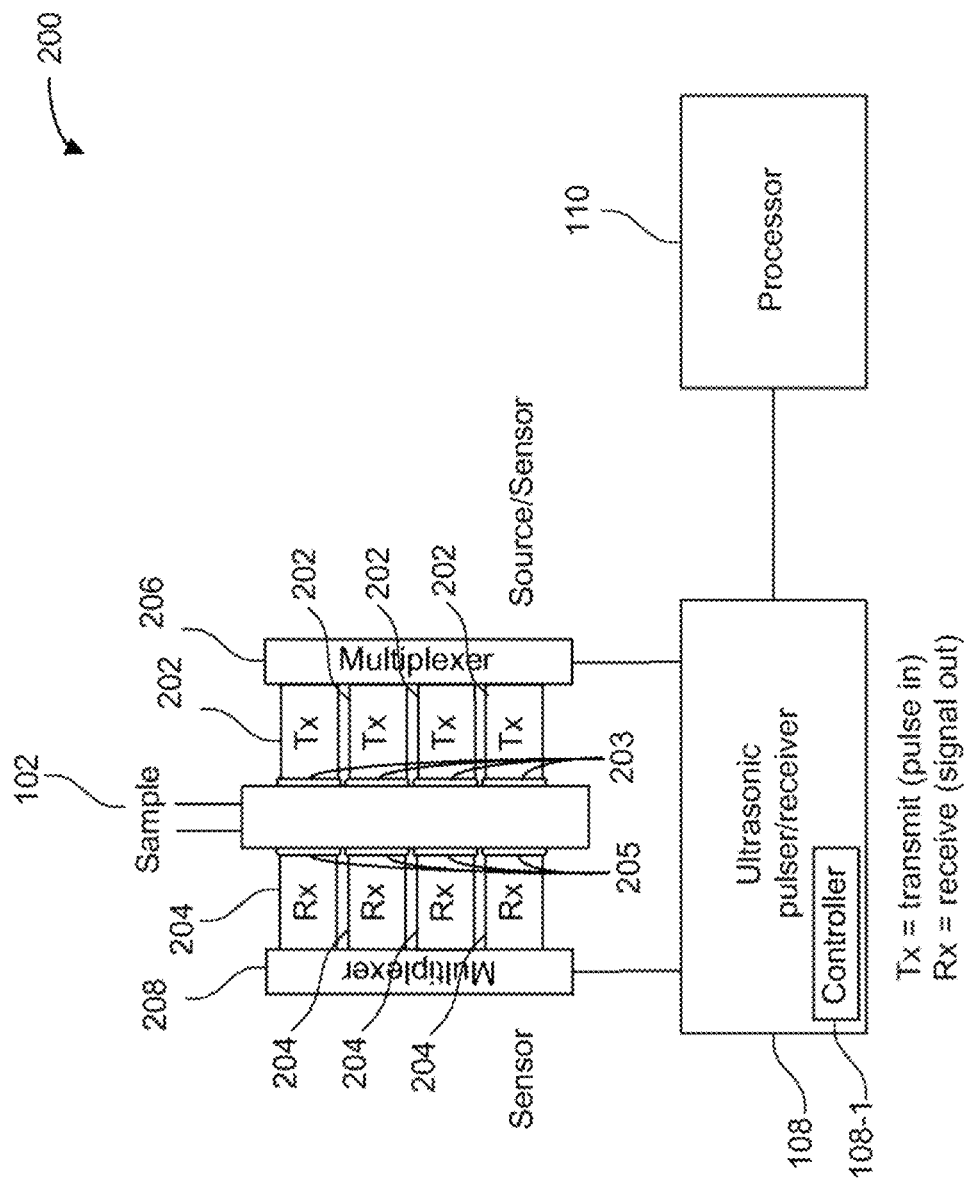
FIG. 2 illustrates another example system for analyzing a sample using acoustic signal-based analysis according to some aspects of the present disclosure.

Description of exemplary systems for performing non-invasive and acoustic measurement of battery cells will be provided with reference to FIGS. 1 and 2. The disclosure then provides example embodiments of techniques for detecting, identifying, and/or locating defects in batteries both during and at post-manufacturing stages, with reference to FIGS. 3-7. The disclosure then provides example embodiments directed to simulating battery defects to be used in models for detecting and identifying defects, with reference to FIGS. 8 and 9A-B. The disclosure concludes with a description of an example device and system architecture with reference to FIG. 10.

FIG. 1 illustrates an example system for analyzing a sample using acoustic signal-based analysis according to some aspects of the present disclosure. System 100 may include sample 102. Sample 102 can include a battery cell or component thereof in any stage of production or manufacture of the battery cell or the individual components. In some examples, sample 102 can include a battery cell, electrolytes in various stages of wetting/distribution through a battery cell, one or more electrodes of the battery cell, thin films, separators, coated sheets, current collectors, electrode slurries, or materials for forming any of the above components during any stage of their fabrication. System 100 can include a transmitting transducer Tx 104 or other means for sending excitation sound signals into the battery cell (e.g., for transmitting a pulse or pulses of ultrasonic or other acoustic waves, vibrations, resonance measurements, etc., through the battery cell). System 100 can further include a receiving transducer Rx 106 or other means for receiving/sensing the sound signals, which can receive response signals generated from signals transmitted by Tx transducer 104. Any type of known or to be developed transducer for transmitting and receiving acoustic signals may be used as Tx transducer 104. Transmitted signals from Tx transducer 104, from one side of sample 102 on which Tx transducer 104 is located, may include input excitation signals. Reflected signals, e.g., from another side of sample 102, may include echo signals. It is understood that references to response signals may include both the input excitation signals and the echo signals. Further, Tx transducer 104 may also be configured to receive response signals, and similarly, Rx transducer 106 may also be configured to transmit acoustic signals. Any type of known or to be developed transducer for transmitting and receiving acoustic signals may be used as Rx transducer 106. Therefore, even though separately illustrated as Tx and Rx, the functionalities of these transducers may be for both sending and receiving acoustic signals. In various alternatives, even if not specifically illustrated, one or more Tx transducers and one or more Rx transducers can be placed on the same side or wall of sample 102, or on different (e.g., opposite) sides. Throughout this disclosure, reference may be made to a transducer pair (a transmitting transducer and a receiving transducer). Transducer Tx 104 and transducer Rx 106 may form a pair of transducers.

Acoustic pulser/receiver 108 can be coupled to Tx and Rx transducers 104, 106 for controlling the transmission of acoustic signals (e.g., ultrasound signals) and receiving response signals. Acoustic pulser/receiver 108 may include a controller 108-1 for adjusting the amplitude, frequency, and/or other signal features of the transmitted signals. Acoustic pulser/receiver 108 may also receive the signals from Rx transducers 106. In some examples, acoustic pulser/receiver 108 may be configured as a combined unit, while in some examples, an acoustic pulser for transmitting excitation signals through Tx transducer 104 can be a separate unit in communication with a receiver for receiving signals from Rx transducer 106. Processor 110 in communication with acoustic pulser/receiver 108 may be configured to store and analyze the response signal waveforms according to this disclosure. Although representatively shown as a single processor, processor 110 can include one or more processors, including remote processors, cloud computing infrastructure, etc.

Although not explicitly shown in FIG. 1, more than one Tx transducer and/or more than one Rx transducer can be placed in one or more spatial locations across sample 102. This allows studying a spatial variation of acoustic signal features across sample 102. A multiplexer can be configured in communication with the acoustic pulser/receiver 108 for separating and channeling the excitation signals to be transmitted and the response signals received. In some examples, various acoustic couplants such as couplants 103 and 105 can be used (e.g., solid, liquid, or combinations thereof) for making or enhancing contact between Tx and Rx transducers 104, 106 and sample 102. Furthermore, various attachment or fixturing mechanisms (e.g., pneumatic, compression, screws, springs etc.) can also be used for establishing or enhancing the contact between Tx and Rx transducers 104, 106 and sample 102.

FIG. 2 illustrates another example system for analyzing a sample using acoustic signal-based analysis according to some aspects of the present disclosure. In comparison with FIG. 1, system 200 of FIG. 2 illustrates a system in which multiple pairs of transmitting and receiving transducers are used for transmitting signals through a sample under testing (e.g., a battery cell) and performing acoustic signal-based analysis of the sample.

System 200 includes several transmitting Tx transducers 202 (each of which may be the same as Tx transducer 104 of FIG. 1). While an array of four examples Tx transducers 202 are shown in FIG. 2, the disclosure is not limited to four. Any number of transducers may be used (e.g., any number of Tx transducers ranging from 1 to 10, 15, 20, etc.).

Similarly, system 200 includes a number of receiving (sensing) Rx transducers 204 (each of which may be the same as Rx transducer 106 of FIG. 1). While an array of four examples Rx transducers 204 are shown in FIG. 2, the disclosure is not limited to four. Any number of transducers may be used (e.g., any number of Rx transducers ranging from 1 to 10, 15, 20, etc.). Any given Tx transducer 202 and Rx transducer 204 may form a transducer pair (FIG. 2 illustrates four transducer pairs). FIG. 2 also illustrates a multiplexer 206 coupled to the array of four Tx transducers 202 and a multiplexer 208 coupled to the array of four Rx transducers 204. As described above, each one of multiplexers 206 and 208 may be configured in communication with the acoustic pulser/receiver 108 for separating and channeling the excitation signals to be transmitted and the response signals received, respectively. In some examples, various acoustic couplants such as couplants 203 and 205 can be used (e.g., solid, liquid, or combinations thereof) for making or enhancing contact between Tx and Rx transducers 202, 204 and sample 102. Furthermore, various attachment or fixturing mechanisms (e.g., pneumatic, compression, screws, etc.) can also be used for establishing or enhancing the contact between Tx and Rx transducers 202, 204 and sample 102.

Spacing between Tx transducers 202 and Rx transducers 204 may be uniform and the same. System 200 also includes additional elements such as sample 102, ultrasonic pulser/receiver 108 (controller 108-1), processors 110, each of which may be the same as the corresponding counterpart described above with reference to FIG. 1 and hence will not be described further for sake of brevity.

Example systems 100 and 200 may have any shape or form, may be standalone systems, may be portable or stationary, etc.

With example systems used for acoustic signal analysis of batteries described with reference to FIGS. 1 and 2, the disclosure now turns to describing various rastering systems that utilize the functionalities and components of systems 100 and 200 to accommodate acoustic inspection of battery cells having different shapes and sizes.

Figure 3:
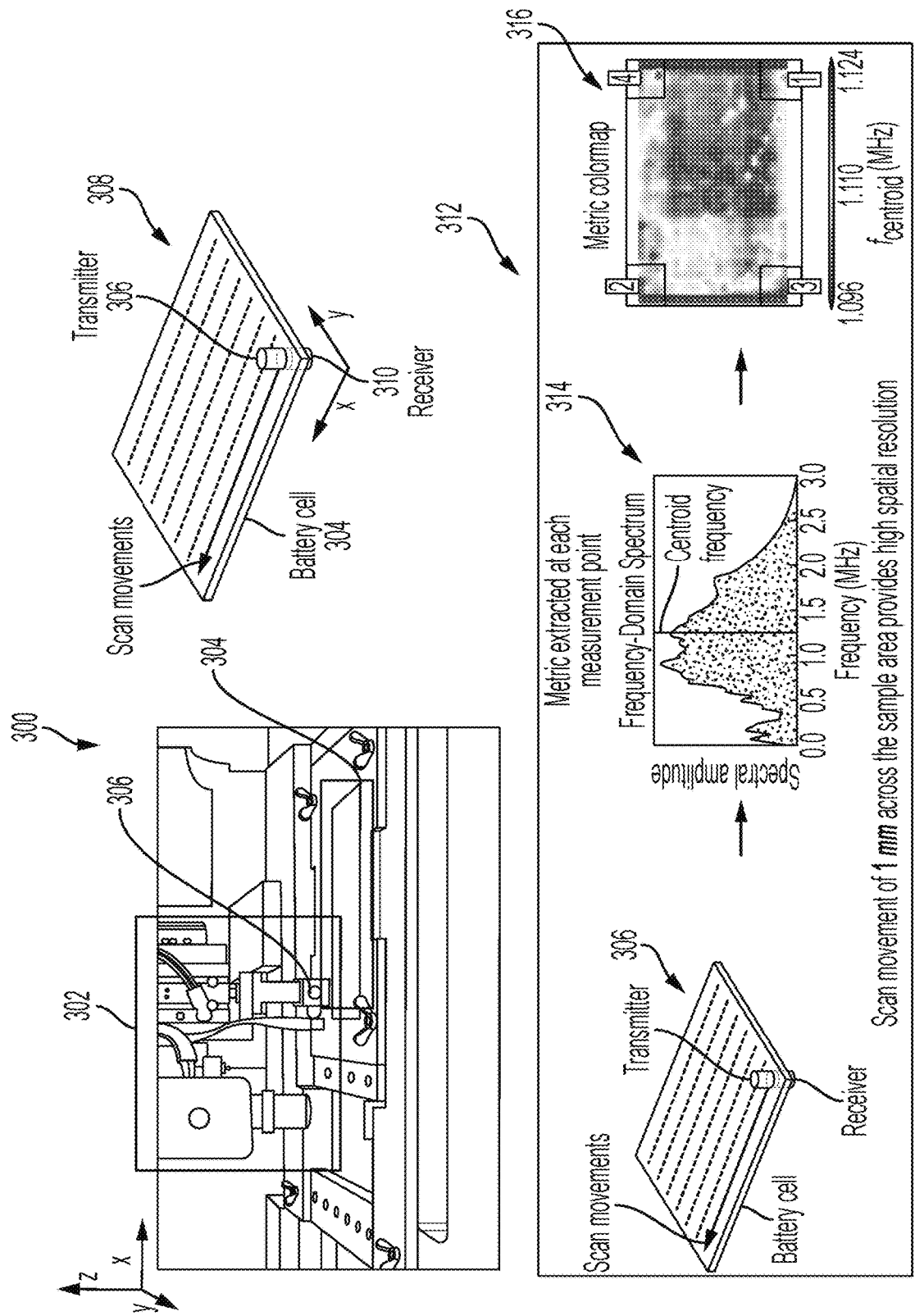
FIG. 3 illustrates an example rastering system for acoustic inspection of rectangular battery cells according to some aspects of the present disclosure.

FIG. 3 illustrates an example rastering system for acoustic inspection of rectangular battery cells according to some aspects of the present disclosure.

Example structure 300 of FIG. 3 is an image of a real-time operation of system 302 to acoustically measure physical characteristics of an example rectangular battery cell 304. Similar to systems 100 and 200 of FIGS. 1 and 2, system 302 may include transducer(s) such as transducer 306 mounted on a mechanical or electrical actuator mounted on an x and/or y and/or z motion stages. Transducer 306 may be controlled to transmit acoustic signals through multiple locations on battery cell 304. While not shown in example structure 300, there may be an equivalent receiving transducer on the bottom surface of battery cell 304 for receiving response signals in response to acoustic signals transmitted via transducer 306.

In example 300, either system 302 and/or alternatively a platform on which battery cell 304 sits, can move horizontally in the x and/or y direction shows in order for transducer 306 to scan and measure multiple locations across battery cell 304. This movement is shown in example 308 where after each instance of measurement, pair of transducers 306 and 310 move a predetermined distance in the x and/or y direction to make measurements (distinct and separate/independent measurements) across battery cell 304 and hence 'scan' and measure the entire surface of battery cell 304.

Example flow 312 illustrates this process whereby after each measurement by transmitter transducer 306/receiver transducer 310, system 302 generates acoustic waveforms, which can be processed through various methods of signal processing, to generate acoustic metric 314 or a multitude of acoustic metrics for that particular measurement. Thereafter, system 302 (and/or alternatively battery cell 304) moves a predetermined distance in the x and/or y direction (e.g., 1 mm, 2 mm, etc.) to repeat the measurement and a different location and generate a similar acoustic metric(s) 314 at the new location. Once the scan of battery cell 304 is complete, all acoustic metrics corresponding to the different measurement locations may be aggregated to an acoustic map (metric map) of the entire battery cell 304 such as map 316. Individual acoustic metrics 314 and/or aggregated map 316 may be further processed/analyzed to extract meaningful acoustic features or scores indicative of physical characteristics of battery cell 304. Such physical characteristics can include, but are not limited to, state of health, stage of charge, different scores indicative of current and/or future physical state and performance of battery cell 304. Such scores can include, but are not limited to, a wetting score, a Solid Electrolyte Interphase (SEI) formation score, an aging score, cycle life prediction score, detect/label/location defects in battery cells, etc. Various numerical and signal processing techniques, which may utilize trained machine learning models can be used to extract and interpret the meaningful acoustic features indicative of physical characteristics of battery cell 304. Non-limiting examples of such techniques are developed by Liminal Insights, Inc. of Emeryville, CA including techniques described in U.S. application Ser. No. 17/112,756 filed on Dec. 4, 2020, the entire content of which is incorporated herein by reference.

Figure 4:
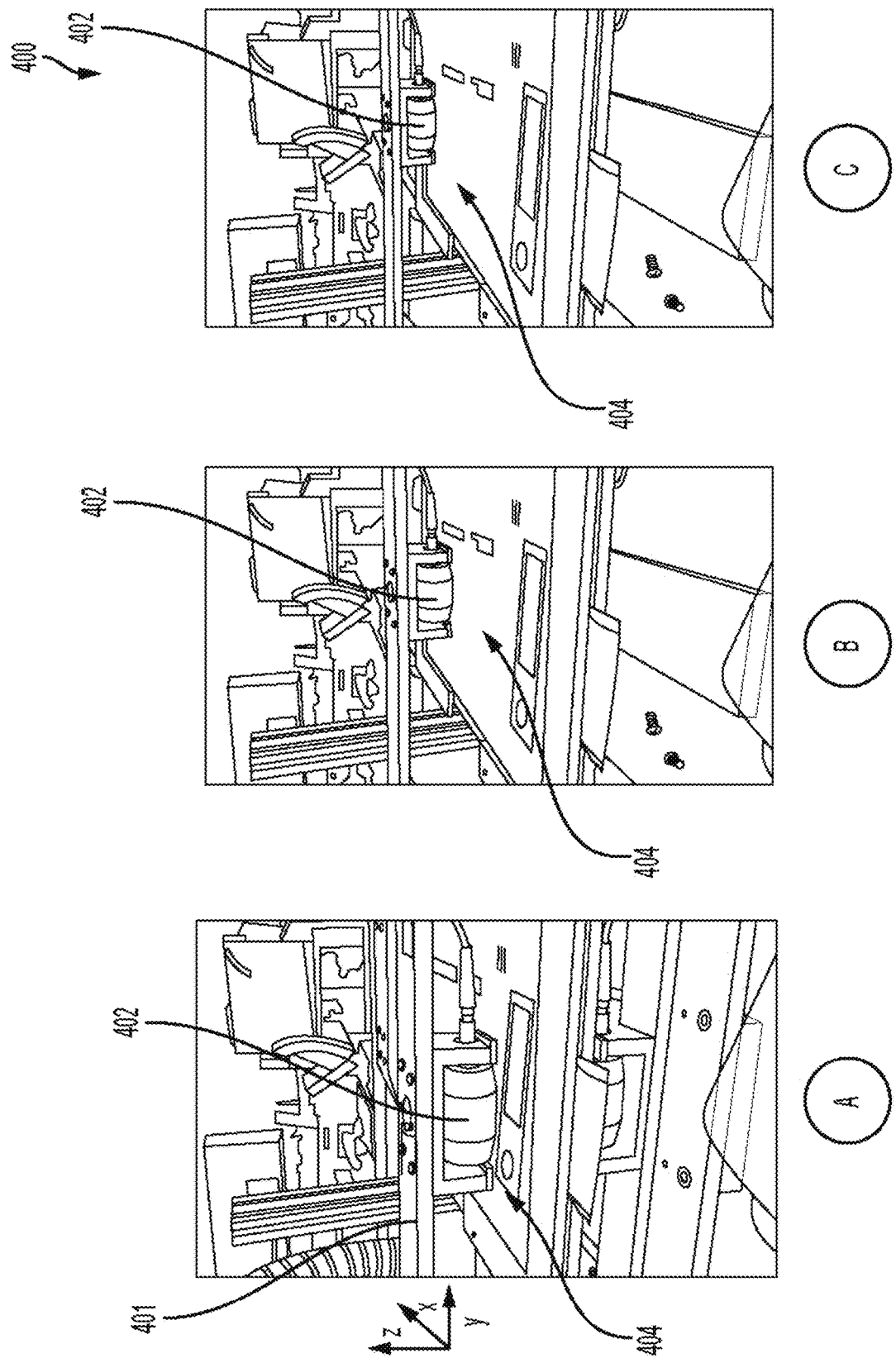
FIG. 4 illustrates another example rastering system for acoustic inspection of rectangular battery cells according to some aspects of the present disclosure.

FIG. 4 illustrates another example rastering system for acoustic inspection of rectangular battery cells according to some aspects of the present disclosure.

Example 400 of FIG. 4 illustrates three snap shots A, B and C, of a system. Each snap shot is of the example system in different positions as it scans battery cell 404. Battery cell 404 may be a rectangular/flat cell.

Transducer 402 may be a roller transducer fixed to a housing/arm 401, which can be made of any known or to be developed material and can be equipped with mechanical and/or electrical systems and actuators to enable arm 401 move transducer 402 across battery cell 404 to perform acoustic measurements.

At snapshot A, transducer 402 is show in a state where it is above battery cell 404 and ready to start scanning battery cell 404. At snapshot B, transducer 402 has made contact with battery cell 404 and is rolling across battery cell 404 making acoustic measurements. At snapshot C, transducer 402 is show at the end (other edge of battery cell 404 having complete one sweep/scan of battery cell 404. In this example of FIG. 4, transducer 402 is performing a one-sided scan of battery cell 404. In other words, roller transducer 402 may function as both a transmitter and received of acoustic signals on battery cell 404, which can then be processed and analyzed to extract meaningful acoustic features as described above.

Similar to the example of FIG. 3, either arm 401/transducer 402 or battery cell 404 may be moved in x and/or y directions to enable roller transducer 402 to scan the entire surface of battery cell 404. Arm 402 may also move up and down in the z direction to bring transducer 402 into contact with a battery cell being inspected and move away transducer 402 from battery cell 404 after completion of a sweep/scan.

In some examples, ultrasonic measurements performed by transmitting/receiving transducers such as transducers 104/106, 202/204, 306/310, and 402 of FIGS. 1-4 include, but are not limited to, Pulse/Echo, Pitch Catch & Through Transmission, Beam Steering & Phase Array Applications. The measurements can be air coupled, liquid coupled, and/or solid contact solutions that can be adjusted to balance Signal to Noise Ratio (SNR) and various test environment tradeoffs. The measurements can be performed according to various delay line and beam focusing strategies to detect sub 100 μm defects in battery cells.

Furthermore, transducers 104/106, 202/204, 306/310, and 402 of FIGS. 1-4 can be packed into 1D, 2D, and/or 3D arrays that can be controlled via a common and/or individualized actuation systems (will be described below with reference to FIG. 8) to statically or dynamically measure batteries in real-time high throughput scenarios.

Two-sided actuation system(s) can be designed to bring single transducers, transducer arrays, and other ultrasonic sensors to the proper focal distance from a battery cell to be inspected if non-contact inspection is being performed, or in the alternative, can be designed to bring the sensor head(s) to make full physical contact with the inspected battery cell. The actuation system(s) and their dynamics can be fully tunable and controllable via one or more controllers as will be described below with reference to FIG. 8. Variable lateral resolution can be chosen and implemented automatically depending on whether the defect/phenomena of interest is a larger bulk defect or a localized defect embedded inside a battery cell such as sample 102/202, battery cell 304/404, etc. Sample 102 may be battery cells similar to battery cells 304 and 404.

Variable lateral resolution can be chosen and implemented automatically depending on whether the defect/phenomena of interest is a larger bulk effect or a localized defect embedded deep inside the battery cell.

Example systems of FIGS. 1-4 and more particularly rastering systems of FIGS. 3 and 4 can be designed such that battery cells to be inspected can be automatically inserted for inspection and thereafter removed, allowing such systems to be fully integrated within the battery manufacturing lines for fast and non-invasive inspection of battery cell components such as electrodes and separators, battery cells, battery modules, battery packs, etc.

Furthermore, example systems of FIGS. 1-4 and more particularly rastering systems of FIGS. 3 and 4 can utilize an automated rotating carousel architecture to switch between different types of transducers (e.g., between transducers 306/310 and roller transducer 402) without the need for manual replacement of transducers for different types of battery cells to be inspects.

Figure 5:
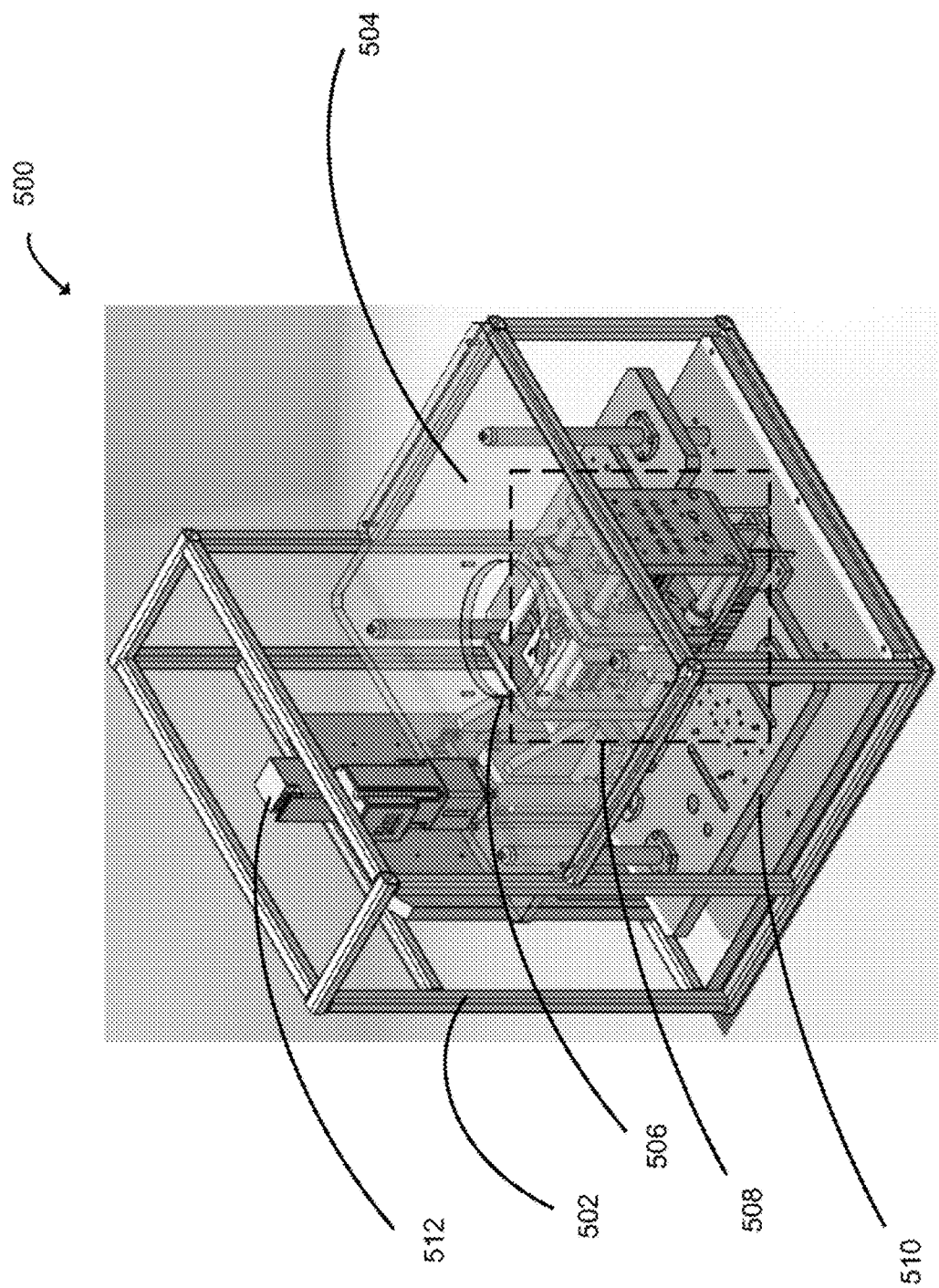
FIG. 5 illustrates an example rastering system for acoustic inspection of cylindrical battery cells according to some aspects of the present disclosure.

FIG. 5 illustrates an example rastering system for acoustic inspection of cylindrical battery cells according to some aspects of the present disclosure.

Example system 500 for inspection of cylindrical battery cells can include a casing 502 made out of any known or to be developed material. A glass top 504 may cover a portion of system 500 and include an opening 506 for receiving a cylindrical battery cell to be acoustically inspected. A holding mechanism 508 may be used for holding and/or rotating cylindrical battery cell to be inspected. Examiner of this will be further described below with reference to FIGS. 6 and 7. Additionally, system 300 may include a stage 510 for mounting and installing transducers for multiple ways of inspecting cylindrical acoustic cells, which will be further described below. FIG. 5 further illustrates an example z-translation motor 512. Motor 512 is configured to allow full rotation of a cylindrical battery cell for acoustic inspection with infinite resolution. For instance, motor 512 can control movement of multiple idlers to rotate a cylindrical battery cell.

Figure 6:
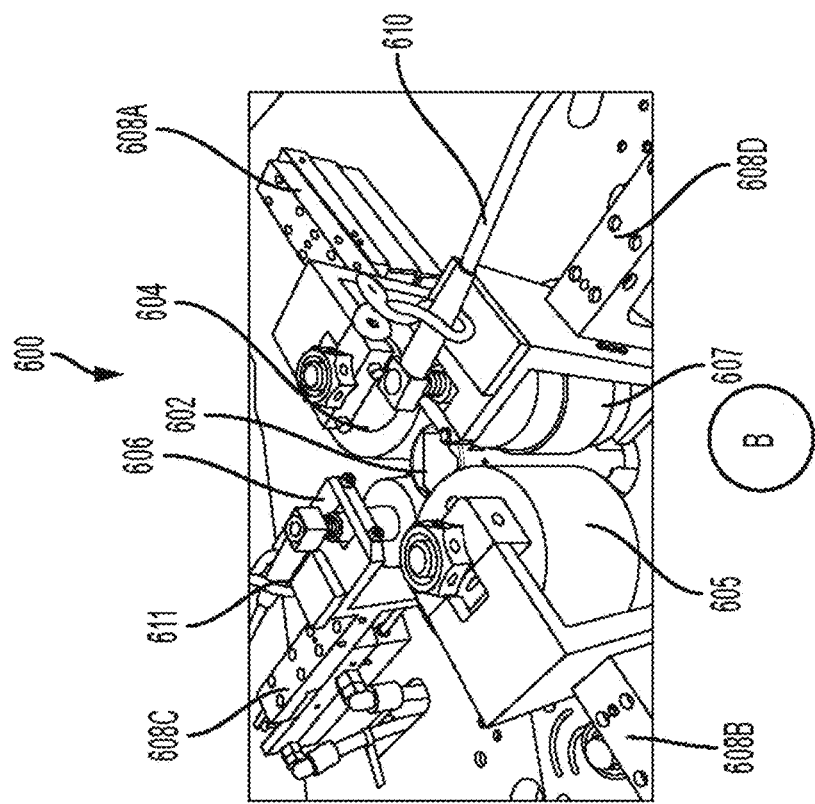
FIG. 6 illustrates an example of system of FIG. 5 in action for inspection of cylindrical battery cells according to some aspects of the present disclosure.
Figure 6:
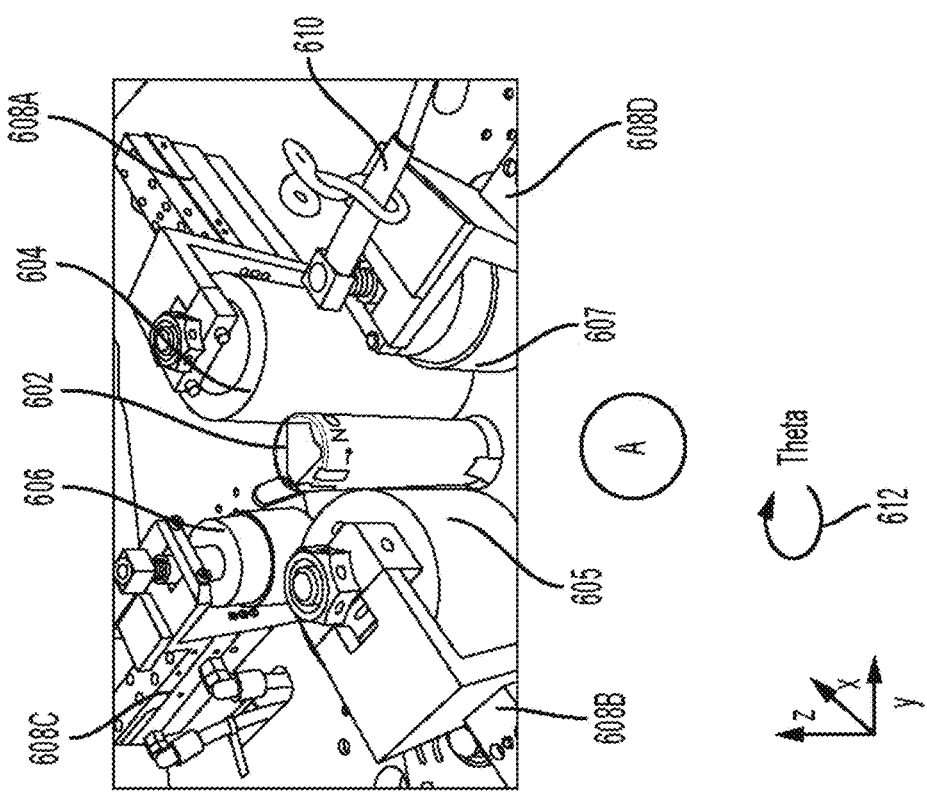

FIG. 6 illustrates an example of system of FIG. 5 in action for inspection of cylindrical battery cells according to some aspects of the present disclosure.

Example 600 includes two snapshots A and B of operation of system 500 of FIG. 5.

In snapshot A, cylindrical cell 602 is shown placed inside a holder (e.g., via opening 506 in FIG. 5) within system 500. Two example rollers (may also be referred to as idlers or grippers) 604 and 605 are shown that are connected to actuators (mechanical arms) 608A and 608B, respectively. In one example, actuators 608A and 608B may be controlled/operated by motor 512. Snapshot A also shows two roller (cylindrical) transducers 606 and 607, each being controlled/driven by actuators 608C and 608D, respectively. Each of transducers 606 and 607 may have a wired controller to a controller (e.g., processor 110 of FIG. 1) via cable 610 and 611. Cable 611 is shown in snapshot B. each of transducers 606 and 607 may be an array of transducers packaged in a cylindrical unit to perform a single instance of transmission of acoustic signals and reception thereof at every angle of rotation. In this case, at any given angle, an entire vertical or axial slice of battery cell 602 (from top to bottom of battery cell 602) may be acoustically measured in that single instance of transmission and reception of acoustic signals.

In snapshot A, rollers 604 and 605 as well as transducers 606 and 607 are separated from cylindrical cell 602 indicating that either battery cell 602 has just been placed inside system 500 for inspection or that the inspection of battery cell 602 is completed and hence may be removed from system 500.

In snapshot B, rollers 604 and 605 as well as transducers 606 and 607 are in contact with cylindrical cell 602. While in contact, rollers 604 and 605 may rotate cylindrical cell 602 in theta direction (as indicated by 612). With each incremental rotation in theta-direction 612, transducers 606 and 607 perform an acoustic inspection of cylindrical cell 602 by transmitting and receiving acoustic signals therethrough. After each rotational measurement to measure a part or every theta position between 0° and 360°, the battery cell 602 may be translated (moved) in the axial (theta)- or z-direction by some incremental distance. Rotation of cylindrical cell 602 in theta-direction 612 continues until the entire axial surface of cylindrical cell 602 is acoustically scanned.

Figure 7:
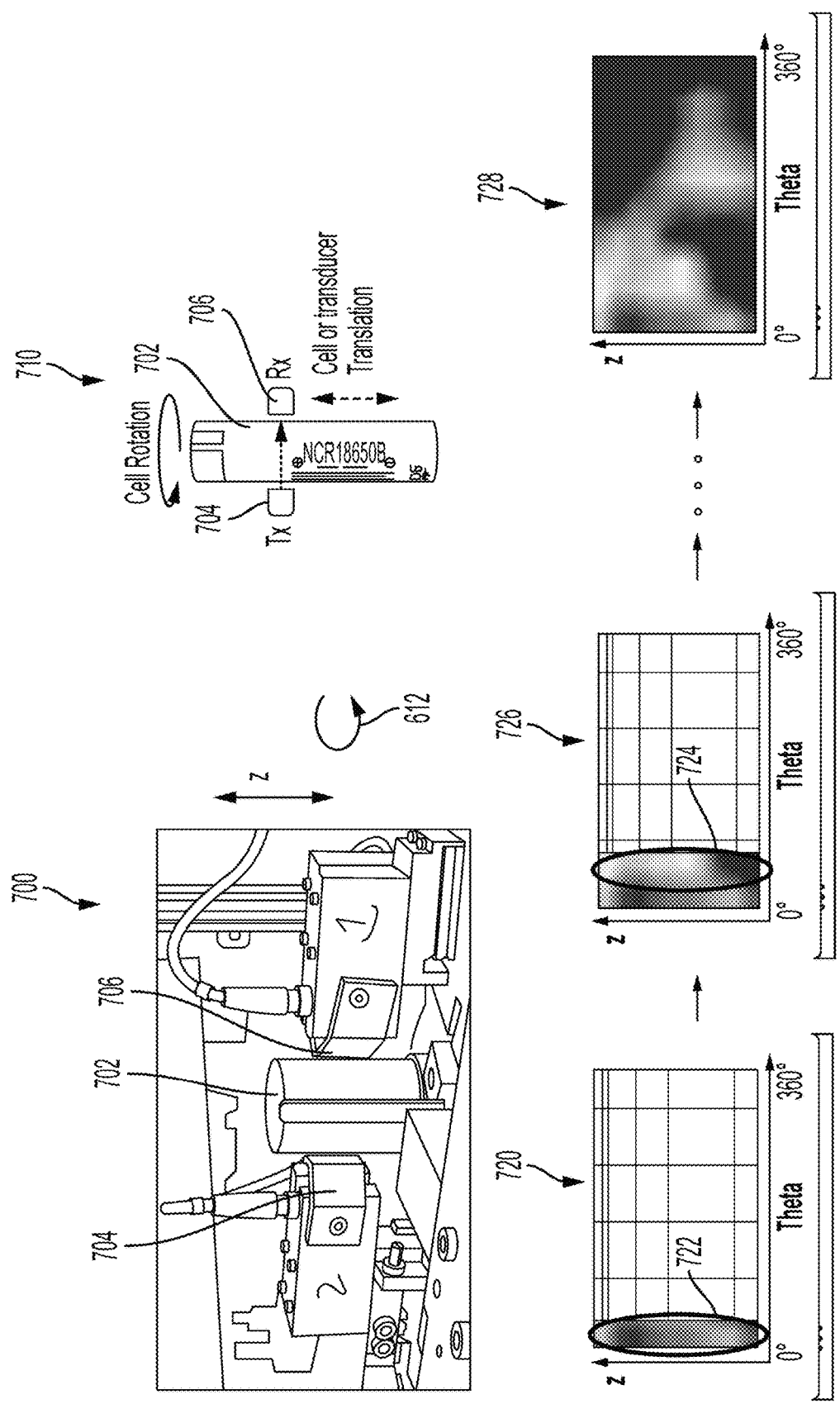
FIG. 7 illustrates another example of system of FIG. 5 for inspection of cylindrical battery cells according to some aspects of the present disclosure.

FIG. 7 illustrates another example of system of FIG. 5 for inspection of cylindrical battery cells according to some aspects of the present disclosure.

Image 700 shows an example of rastering system 500 for acoustic inspection of cylindrical battery cells in action. In comparison with example of FIG. 6, cylindrical cell 702 may not be held in place and rotated using rollers but instead may sit within a mechanism that controls rotation of cylindrical cell 702 in theta-direction 612 via the bottom of cylindrical cell 702. Cylindrical cell 702 may be rotated in theta-direction 612 at a predetermined angle of rotation. For example, cylindrical cell 702 may be rotated 5 degrees at a time, and at each rotation may be acoustically scanned using transducers 704 and 706. Transducers 704 and 706 may be controlled to move up and down in the z-direction to scan cylindrical cell 702 at a given angle to perform multiple distinct and independent measurements across the curved surface (axial length) of cylindrical cell 702 (e.g., a slice of cylindrical cell 702). This process continues until the entire axial surface (curved surface) of cylindrical cell 702 is acoustically scanned.

Schematic 710 illustrates a simpler version of the process of rotating and inspecting cylindrical cell 702.

FIG. also shows a gradual building of an aggregated map of acoustic measurement of cylindrical cell 702. As described, at each angle of rotation, transducers 704 and 706 may move up and down to transmit and receive acoustic signals through a strip of vertical locations on cylindrical cell 702. The result of these acoustic measurements are be recorded as shown. For instance, result 720 is indicative of acoustic measurement 722 of locations along the vertical surface of cylindrical cell 702 at angle 0. Thereafter, cylindrical cell 702 may be rotated 5 degrees and another set of acoustic measurements 724 may be obtained and added to measurement 722 to result in map 726. This process may continue until cylindrical cell 702 is rotated 360 degrees and acoustically measured to produce aggregated map 728. Results shown in map 728 may be processed and analyzed as described above to extract meaningful acoustic features indicative of physical characteristics of battery cell 702.

Non-limiting examples described above utilize a combination of rotary propulsion and alignment mechanism, as described, to simultaneously fix and spin a cylindrical cell of any size or length about its axis. Such systems are compatible with for example 18650, 2170, and 4680 cylindrical cell form factors as well any other existing and/or to be developed form factor, size, and/or shape for cylindrical battery cells.

Within these example systems, a transducer, pair of transducers, transducer arrays, or other type of ultrasonic sensors can be moved adjacent to this mechanism in its length axis as the propulsion system moves in theta-direction, and then measured at select points about the linear cross section of a battery cell such as cylindrical cell 702. The result is a fully deconstructed ultrasonic scan of a cylindrical battery that can be visualized in 2D space, as described with reference to FIG. 7.

In some examples, example systems described above with reference to FIGS. 5-7 EW designed so cylindrical samples can be safely and effectively inserted and removed from the system post-test without the need for manual engagement with the rotary propulsion and alignment system at the required throughputs for battery production.

Figure 8:
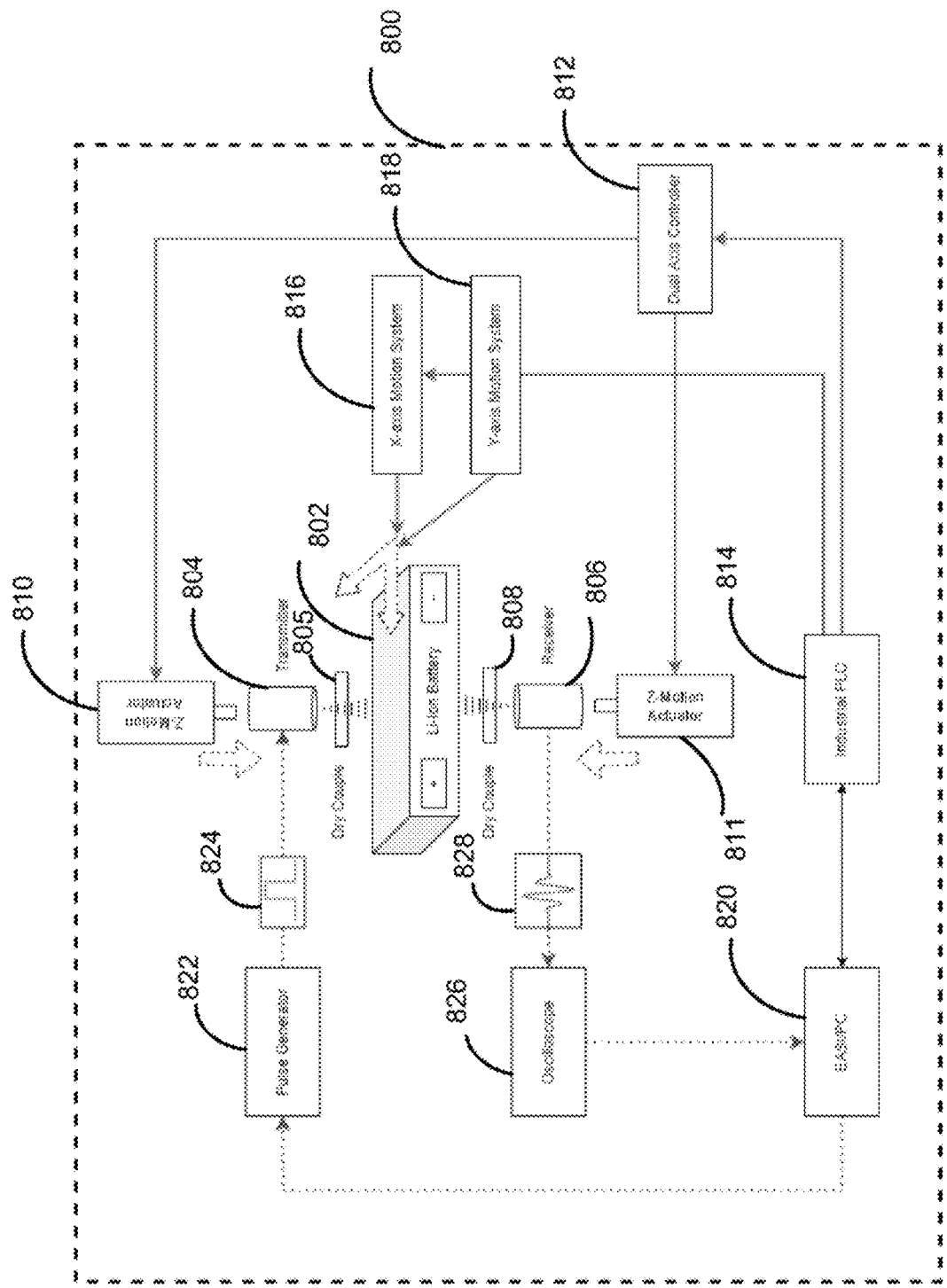
FIG. 8 illustrates an example system architecture for enabling operation of example rastering systems of FIGS. 3-7 according to some aspects of the present disclosure.

FIG. 8 illustrates an example system architecture for enabling operation of example rastering systems of FIGS. 3-7 according to some aspects of the present disclosure.

Example architecture 800 is for a rastering system for inspection of rectangular battery cells (described with reference to FIGS. 3 and 4) but can be equally applicable to rastering systems for inspection of cylindrical battery cells.

As shown, a rectangular battery cell 802 may be placed within the rastering system having architecture 800. Acoustic measurements may be performed using transducers 804 (transmitting transducer) and 806 (receiving/receiver transducer). Transducers 804 and 806 can be single transducers, or multiple transducers, or linear or matrix array of transducers. Couplants 805 and 808 may be the same as couplants 103/105 and 203/205 described above with reference to FIGS. 1 and 2.

Architecture 800 may also include actuators 810 and 811 for controlling movement of transducers 804 and 806, respectively. Actuators 810 and 811 may be independently controlled or commonly controlled by, for example controller 812. Controller 812 may receive commands for controlling actuators 810 and 811 from a Programmable Logic Controller (PLC) 814. PLC 814 may be programmed for testing of battery cells in a given manufacturing setting with an emphasis on commonality to accommodate all transducers of different size, frequency, bandwidth, etc. with minimal Non-Recurring Engineering (NRE) costs. For instance, PLC 814 may be programmed to control operation of controller 812 and hence actuators 810 and 811 to move transducers 804 and 806 a predetermined distance to acoustically measured battery cell 802. PLC 814 may further be programmed to control systems 816 and 818 to move battery cell 802 in x and/or y directions. Motion systems 816 and 818 may alternatively be controlled by controller 812.

PLC 814 may be programmed via EASI/PC 820, which in turn may interface with pulse generator 822 to transmit acoustic signal 824 (e.g., a pulse, a pitch, etc.) to transmitter transducer 804. EASI/PC 820 may also interface with oscilloscope 826 to control reception of response signal 828 via receiver transducer 806.

Figure 9:
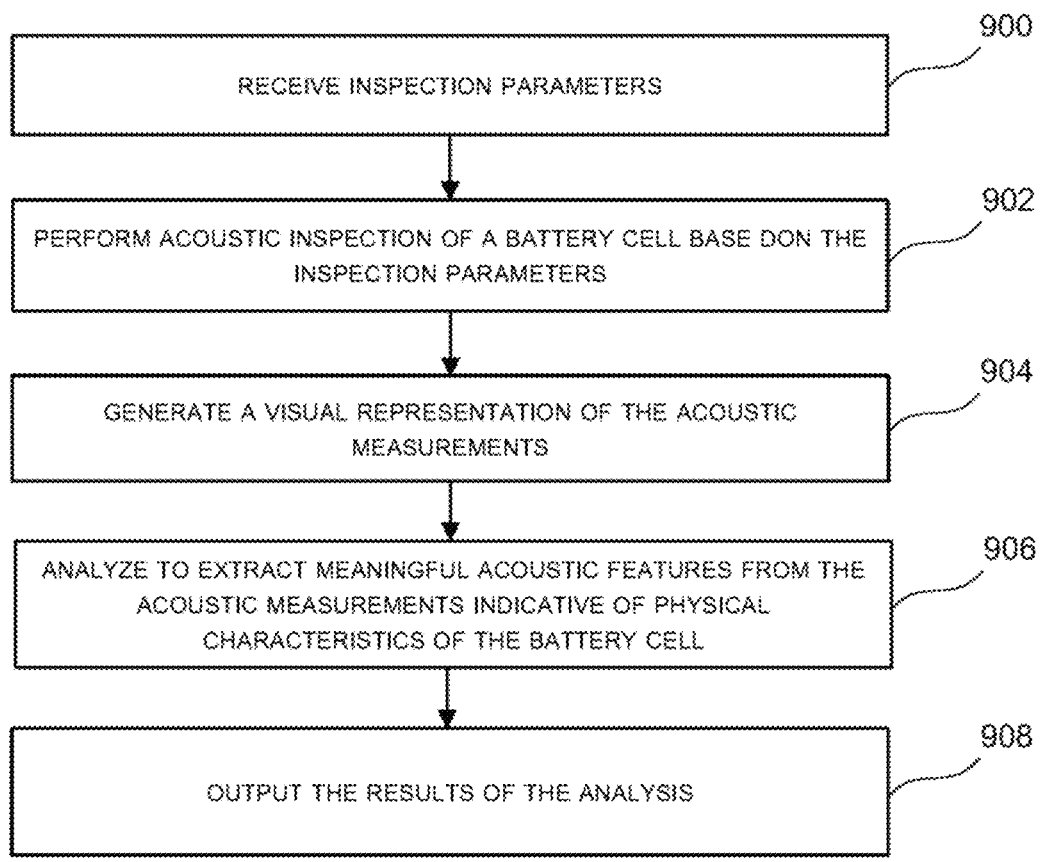
FIG. 9 illustrates an example process of operating a rastering system for acoustic inspection of battery cells according to some aspects of the present disclosure.

FIG. 9 illustrates an example process of operating a rastering system for acoustic inspection of battery cells according to some aspects of the present disclosure. Process of FIG. 9 will be described from the perspective of a controller. A controller can be PLC 814 of FIG. 8, controller 812 of FIG. 8, or processor 110 of FIGS. 1 and 2. It should be noted that such controller may have computer-readable instructions (stored thereon or in an accompanying memory) executed thereon to perform the steps of FIG. 9

At step 900, the controller may receive inspection parameters. Inspection parameters can include, but are not limited to, specifications controlling movement of transmitter and receiver transducers 804 and 806, specifications regarding movement of battery cell 802 to be inspected (e.g., incremental movements in x and/or y direction), types of acoustic measurements to be performed (e.g., pulse/echo, Pitch Catch & Through Transmission, etc.).

Specifications may optionally include parameters for frequency of automatic placement and removal of battery cells inside the rastering system for inspection, specifications regarding modifying the ultrasonic tests utilized, etc.

Inspection parameters may be dynamic and interchangeable in a sense that depending on shape, size, and/or form factor of a battery cell to be inspected, one or more of the inspection parameters may change to accommodate such shape, size and/or form factor of a particular battery cell.

At step 902, the controller may perform acoustic inspection of battery cells based on the inspection parameters received.

At step 904, the controller may generate a visual representation of acoustic measurements performed at step 902. An example of such measurement may be map 316 of FIG. 3, map 728 of FIG. 7, etc.

At step 906, the controller may extract meaningful acoustic features indicative of physical characteristics of a battery cell, a battery pack, and/or a battery module under testing, as described above and base don analyzing the acoustic measurements made.

At step 908, the controller may output the results of the analysis at step 906. As described, an output can be any one or more of a wetting score, a SEI formation score, an aging score, cycle life prediction score, detect/label/location defects in battery cells, etc. Various numerical and signal processing techniques, which may utilize trained machine learning models can be used to extract and interpret the meaningful acoustic features indicative of physical characteristics of battery cell 304. Non-limiting examples of such techniques are developed by Liminal Insights, Inc. of Emeryville, CA including techniques described in U.S. application Ser. No. 17/112,756 filed on Dec. 4, 2020, the entire content of which is incorporated herein by reference.

In another example, the output can include the aggregated map of the acoustic measurements (e.g., map 316 or 728) in addition to the results of the analysis performed at step 906.

Figure 10:
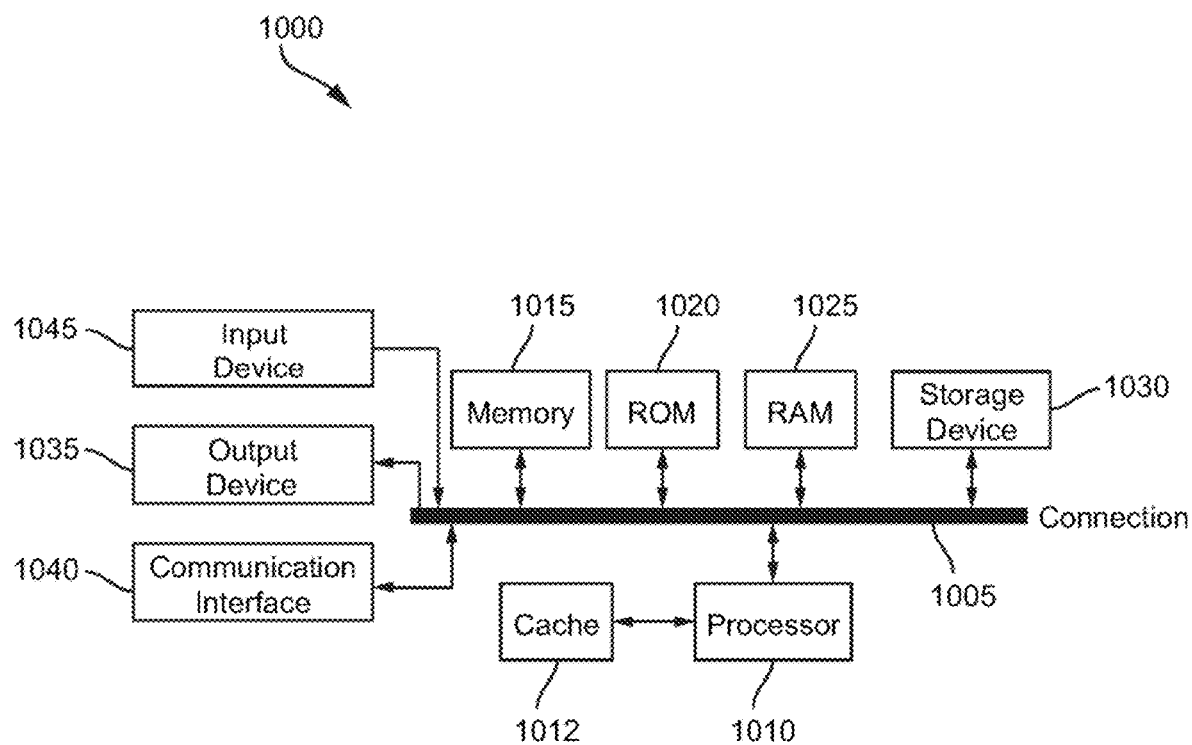
FIG. 10 illustrates an example computing device architecture of an example computing device according to some aspects of the disclosure.

FIG. 10 illustrates an example computing device architecture of an example computing device according to some aspects of the disclosure. Device architecture 1000 of an example computing device which can be used as various components of system 100 or 200 (e.g., processor 110) implement various techniques described herein. The components of the computing device architecture 1000 are shown in electrical communication with each other using a connection 1005, such as a bus. The example computing device architecture 1000 includes a processing unit (CPU or processor) 1010 and a computing device connection 1005 that couples various computing device components including the computing device memory 1015, such as read only memory (ROM) 1020 and random access memory (RAM) 1025, to the processor 1010.

The computing device architecture 1000 can include a cache of high-speed memory connected directly with, in close proximity to, or integrated as part of the processor 1010. The computing device architecture 1000 can copy data from the memory 1015 and/or the storage device 1030 to the cache 1012 for quick access by the processor 1010. In this way, the cache can provide a performance boost that avoids processor 1010 delays while waiting for data. These and other modules can control or be configured to control the processor 1010 to perform various actions. Other computing device memory 1015 may be available for use as well. The memory 1015 can include multiple different types of memory with different performance characteristics. The processor 1010 can include any general-purpose processor and a hardware or software service stored in storage device 1030 and configured to control the processor 1010 as well as a special-purpose processor where software instructions are incorporated into the processor design. The processor 1010 may be a self-contained system, containing multiple cores or processors, a bus, memory controller, cache, etc. A multi-core processor may be symmetric or asymmetric.

To enable user interaction with the computing device architecture 1000, an input device 1045 can represent any number of input mechanisms, such as a microphone for speech, a touch-sensitive screen for gesture or graphical input, keyboard, mouse, motion input, speech and so forth. An output device 1035 can also be one or more of a number of output mechanisms known to those of skill in the art, such as a display, projector, television, speaker device. In some instances, multimodal computing devices can enable a user to provide multiple types of input to communicate with the computing device architecture 1000. The communication interface 1040 can generally govern and manage the user input and computing device output. There is no restriction on operating on any particular hardware arrangement and therefore the basic features here may easily be substituted for improved hardware or firmware arrangements as they are developed.

Storage device 1030 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1025, read only memory (ROM) 1020, and hybrids thereof. The storage device 1030 can include software, code, firmware, etc., for controlling the processor 1010. Other hardware or software modules are contemplated. The storage device 1030 can be connected to the computing device connection 1005. In one aspect, a hardware module that performs a particular function can include the software component stored in a computer-readable medium in connection with the necessary hardware components, such as the processor 1010, connection 1005, output device 1035, and so forth, to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

While the foregoing disclosure shows illustrative aspects of the invention, it should be noted that various changes and modifications could be made herein without departing from the scope of the invention as defined by the appended claims. The functions, steps and/or actions of the method claims in accordance with the aspects of the invention described herein need not be performed in any particular order. Furthermore, although elements of the invention may be described or claimed in the singular, the plural is contemplated unless limitation to the singular is explicitly stated.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. A rastering system for non-invasive and acoustic inspection of battery cells, the system comprising:
   a holder for placing a battery cell inside the system for the acoustic inspection;
   at least one transducer configured to perform acoustic measurements on the battery cell;
   and a controller configured to:
      receive inspection parameters for performing the acoustic measurements, the inspection parameters being tailored to correspond to one or more of a shape, a size, and a form factor of the battery cell,
      control the holder and the at least one transducer to perform the acoustic measurements according to the inspection parameters,
      analyze the acoustic measurements to extract acoustic features indicative of physical characteristics of the battery cell; and
      generate an aggregated map of the acoustic measurements based on the acoustic features extracted.

2. The rastering system of claim 1, wherein the rastering system is configured for inspection of cylindrical battery cells and the battery cell is a cylindrical battery cell.

3. The rastering system of claim 2, wherein the at least one transducer is configured to move vertically along a curved surface of the battery cell at each angle of rotation of the battery cell to transmit and receive acoustic signals through the battery cell.

4. The rastering system of claim 3, wherein the at least one transducer is configured to obtain, based on the acoustic signals received, the acoustic measurements along an axial surface of the battery cell at each angle of rotation of the battery cell.

5. The rastering system of claim 4, wherein the controller is configured to analyze the acoustic measurements and generate the aggregated map at each angle of rotation of the battery cell.

6. The rastering system of claim 2, further comprising:
   one or more rollers configured to rotate the battery cell at a predetermined angle of rotation until an entire curved surface of the battery cell is acoustically measured.

7. The rastering system of claim 6, wherein the at least one transducer is an array of transducers packaged in a cylindrical unit to transmit and receive acoustic signals through an axial surface of the battery cell at each predetermined angle of rotation.

8. The rastering system of claim 6, wherein, after each rotation of the battery cell by the one or more rollers, the at least one transducer is configured to obtain acoustic measurements along an axial surface of the battery cell to yield the acoustic measurements.

9. The rastering system of claim 1, wherein the controller is configured to output at least one of a result of analyzing the acoustic measurements and the aggregated map.

10. The rastering system of claim 9, wherein the at least one transducer is configured to perform one or more of single-sided and a double-sided measurement of the battery cell.

11. The rastering system of claim 10, wherein the at least one transducer is a roller transducer.

12. The rastering system of claim 1, wherein the rastering system is configured for inspection of rectangular battery cells and the battery cell is a rectangular battery cell.

13. The rastering system of claim 12, wherein the battery cell is a flat cell.

14. The rastering system of claim 12, wherein the controller is configured to control a movement of the at least one transducer in at least one of two directions to perform a plurality of distinct acoustic measurements across an entire curved surface of the battery cell.

15. The rastering system of claim 14, wherein the controller is configured to output at least one of the aggregated map and a result of analyzing the plurality of acoustic measurements.

16. The rastering system of claim 1, wherein the inspection parameters specify a plurality of ultrasound tests from among which an ultrasound test may be applied for performing the acoustic measurements.

17. The rastering system of claim 16, wherein the plurality of ultrasound tests include Pulse/Echo, Pitch Catch & Through Transmission, and Beam Steering & Phase Array Applications.

* * * * *